United States Patent
Mills et al.

(10) Patent No.: US 7,850,252 B2
(45) Date of Patent: Dec. 14, 2010

(54) LOOSE TERRAIN TRACTION-ASSIST DEVICE FOR WHEELED ALL-TERRAIN AND UTILITY VEHICLES

(76) Inventors: John Mills, 21730 464th Ave., Volga, SD (US) 57071-6906; Jacob Mills, 21730 464th Ave., Volga, SD (US) 57071-6906

( * ) Notice: Subject to any disclaimer, the term of this patent is extended or adjusted under 35 U.S.C. 154(b) by 164 days.

(21) Appl. No.: 12/032,312

(22) Filed: Feb. 15, 2008

(65) Prior Publication Data
US 2008/0252135 A1    Oct. 16, 2008

Related U.S. Application Data

(60) Provisional application No. 60/923,123, filed on Apr. 12, 2007.

(51) Int. Cl.
*B60B 15/26*    (2006.01)
(52) U.S. Cl. ............... 301/40.1; 301/40.2; 301/41.1; 440/12.66
(58) Field of Classification Search ............ 301/38.1, 301/39.1, 40.1, 40.2, 40.3, 40.4, 40.6, 41.1, 301/43, 44.1, 52; 440/12.66, 12.67, 12.69, 440/100
See application file for complete search history.

(56) References Cited

U.S. PATENT DOCUMENTS

| | | | | |
|---|---|---|---|---|
| 1,568,937 | A * | 1/1926 | Zwalsh | 301/40.1 |
| 1,599,001 | A * | 9/1926 | Anderson et al. | 152/208 |
| 1,658,623 | A * | 2/1928 | Wittkopp | 152/300 |
| 1,810,043 | A * | 6/1931 | Gerth | 152/240 |
| 2,130,448 | A * | 9/1938 | Signori | 301/39.1 |
| 2,336,959 | A * | 12/1943 | Redman | 301/38.1 |
| 2,479,134 | A * | 8/1949 | Porter | 440/12.66 |
| 3,014,547 | A * | 12/1961 | Van Der Lely | 180/308 |
| 3,365,236 | A | 1/1968 | Snedeker | |
| 3,612,613 | A * | 10/1971 | Tricon | 301/41.1 |
| 3,664,709 | A * | 5/1972 | Barr'e | 301/36.1 |
| 3,890,010 | A | 6/1975 | Dove, Jr. et al. | |
| 4,220,372 | A | 9/1980 | Johansen et al. | |

(Continued)

FOREIGN PATENT DOCUMENTS

JP    55127202 A  *  10/1980

(Continued)

OTHER PUBLICATIONS

International Search Report dated, Sep. 16, 2009.

(Continued)

*Primary Examiner*—Russell D Stormer
(74) *Attorney, Agent, or Firm*—Patterson Thuente Christensen Pedersen, P.A.

(57) ABSTRACT

A loose terrain traction assist device for wheeled vehicles includes a generally frusto-conical structure having a proximal portion with a diameter smaller than an overall diameter of a tire of a vehicle, a distal portion that extends outwardly from the wheel, and an outer surface defined between the proximal portion and the distal portion. The traction assist device also includes an attachment arrangement for releasably coupling the frusto-conical structure to a wheel assembly of the vehicle, such that at least part of the frusto-conical structure is adapted to engage with terrain during operation of the vehicle in loose terrain and to not engage with terrain during operation of the vehicle on normal terrain.

7 Claims, 9 Drawing Sheets

U.S. PATENT DOCUMENTS

| | | | |
|---|---|---|---|
| 4,305,621 A * | 12/1981 | Snell et al. | 301/40.2 |
| 4,666,216 A * | 5/1987 | Smith | 301/40.4 |
| 5,013,269 A * | 5/1991 | Legoy et al. | 440/100 |
| 5,423,195 A * | 6/1995 | Peters | 62/457.7 |
| 5,427,398 A * | 6/1995 | Weybrecht | 280/304.1 |
| 5,556,487 A * | 9/1996 | Collard | 152/228 |
| 5,716,106 A | 2/1998 | Warner | |
| 6,062,651 A | 5/2000 | Schaad et al. | |
| 6,068,346 A | 5/2000 | Pender | |
| 6,095,275 A | 8/2000 | Shaw | |
| 6,615,939 B1 | 9/2003 | Karales et al. | |
| 6,904,986 B2 | 6/2005 | Brazier | |
| 7,040,713 B2 | 5/2006 | Rudolf et al. | |
| 2003/0071513 A1 | 4/2003 | Elkow | |

FOREIGN PATENT DOCUMENTS

| | | |
|---|---|---|
| JP | 59023701 A * | 2/1984 |
| WO | WO 8704668 A1 * | 8/1987 |

OTHER PUBLICATIONS

"Tractor Walks on Water," Farmshow, 1983, vol. 7, No. 3, p. 28.

"Mud Wheels Fold Our When You Need 'Em," Farmshow, 1981, vol. 5, No. 3, p. 23.

International Preliminary Report on Patentability (PCT/US2009/034046), dated Aug. 26, 2010.

* cited by examiner

LOOSE TERRAIN TRACTION-ASSIST DEVICE FOR WHEELED ALL-TERRAIN AND UTILITY VEHICLES

RELATED APPLICATIONS

The present application claims the benefit of U.S. Provisional Application No. 60/923,123, filed Apr. 12, 2007, the disclosure of which is hereby incorporated by reference in its entirety.

FIELD OF THE INVENTION

The present invention relates generally to wheeled off-road vehicles. More specifically, the present invention relates to devices and methods for increasing traction of a wheeled off-road vehicle in loose terrain conditions.

BACKGROUND OF THE INVENTION

Off-highway wheeled vehicles are used for utility as well as recreation. Sometimes referred to as off-road vehicles, these vehicles are useful in agriculture, construction, hunting/fishing, military, search and rescue, as well as other industries.

All-terrain vehicles (ATV's) are a specialized type of wheeled off-highway vehicle, characterized by broad, low-pressure tires, a seat to be straddled by the operator, and handlebars for steering. Utility vehicles are an additional subset of off-highway vehicles, often characterized by low-pressure tires, seating for the operator and one or more passengers, a steering wheel, and typically a cargo bed over the rear wheels. A roll bar or enclosed cab may be included on utility vehicles. Some utility vehicles incorporate a 6-wheel configuration having an additional rear axle. Various attachments and implements can be used with ATV's and utility vehicles for specialized tasks.

ATV's and utility vehicles are suited for travel over firmer off-road terrain such as grass, dirt, gravel, and shallow mud and snow. However, these vehicles are typically not capable of traversing more challenging loose terrain such as soft mud, sand, deep snow or even water, due to their relatively low ground clearances. Often, in such loose terrain, an ATV or utility vehicle may sink or become high centered and thereby become immobilized.

The use of tracks on ATV's and utility vehicles allows greater mobility in more challenging terrain such as loose terrains like soft mud, sand, or snow. Different versions of track arrangements are described, for example, in U.S. Pat. Nos. 6,615,939, 6,095,275, and 6,904,986. Unfortunately, such track assemblies typically must be installed in place of the wheels, making it a time-consuming process to switch from wheels to tracks. While useful in certain applications, tracks also have a number of disadvantages. Track assemblies are heavier than wheels and tires and have a much larger contact area, thereby negatively affecting the speed of the vehicle, as well as slowing steering response. Performance on dry or paved surfaces is poor, and sustained operation on paved surfaces rapidly wears out the tracks. Further, tracks offer little to no improvement when traversing water as compared to conventional wheeled configurations. Track assemblies are also mechanically complex, having many moving parts that are susceptible to damage or wear. The large contact area of tracks makes them difficult to free in the event they become frozen to the ground. In addition, track assemblies are prohibitively expensive for a large majority of ATV and utility vehicle owners.

Another approach to increasing mobility of off-highway vehicles over difficult terrain is to add an additional wheel on each axle hub. The footprint of the dual-wheel configuration is approximately doubled, resulting in improved performance over certain kinds of loose terrain. Different examples of dual wheel arrangements are described, for example, in U.S. Pat. Nos. 4,220,372, 6,062,651, 6,068,346, and 7,040,713. However, similar to track assemblies, the weight of the added wheels negatively affects vehicle performance. A single ATV tire weighs between 10 and 30 pounds, and the addition of a wheel, tire, and mounting hardware can add over 50 pounds per corner of the vehicle. This amount of added weight decreases the top speed of the vehicle, decreases acceleration, makes steering more difficult, as well as increasing turning radius. Further, the auxiliary wheel of a dual wheel arrangement typically is not covered by the vehicle's fenders, exposing the operator of the vehicle to dirt and debris flung off of the wheels.

A need exists, therefore, for improved devices and methods to allow off-highway wheeled vehicles to operate more effectively in loose terrain without the use of tracks or additional wheels.

SUMMARY OF THE INVENTION

In one embodiment, the present invention is a loose terrain traction assist device for wheeled vehicles, comprising a generally frusto-conical structure having a proximal portion with a diameter smaller than an overall diameter of a tire of a vehicle, a distal portion that extends outwardly from the wheel, and an outer surface defined between the proximal portion and the distal portion. The traction assist device also includes an attachment means for releasably coupling the frusto-conical structure to a wheel assembly of the vehicle, such that at least part of the frusto-conical structure is adapted to engage with terrain during operation of the vehicle in loose terrain and to not engage with terrain during operation of the vehicle on normal terrain.

In another embodiment, the present invention is a system for increasing traction of a wheeled vehicle in loose terrain, comprising a traction-assist device having a proximal portion configured to abut a tire of a vehicle and one or more traction features presented on an outer surface of the traction-assist device between the proximal portion and a distal portion, the traction features presented on the outer surface having an effective diameter relative to an axis of the tire that is less than an overall diameter of the tire, and structure within an inner portion of the traction assist device adapted to enable releasable coupling of the traction-assist device to a wheel hub of the vehicle, wherein at least the one or more traction features are configured to engage with terrain during operation of the vehicle in loose terrain and to not engage with terrain during operation of the vehicle on normal terrain.

In a further embodiment, the present invention is a method of providing a traction-assist device for a wheeled vehicle, comprising providing a traction-assist device having a generally frusto-conical structure including a proximal portion with a diameter smaller than an overall diameter of a tire of a vehicle, a distal portion that extends outwardly from the wheel, and an outer surface defined between the proximal portion and the distal portion that is adapted to engage with terrain during operation of the vehicle in loose terrain and to not engage with terrain during operation of the vehicle on normal terrain. The method further comprises providing instructions for attaching the frusto-conical structure to a wheel assembly of the vehicle by aligning a center axis of the traction device with a center axis of a wheel assembly of the vehicle, and securing the traction-assist device to the wheel assembly.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the claims.

DETAILED DESCRIPTION OF THE EMBODIMENTS

In the following detailed description of the present invention, numerous specific details are set forth in order to provide a thorough understanding of the present invention. However, one skilled in the art will recognize that the present invention may be practiced without these specific details. In other instances, well-known methods, procedures, and components have not been described in detail so as to not unnecessarily obscure aspects of the present invention.

Figure 1:
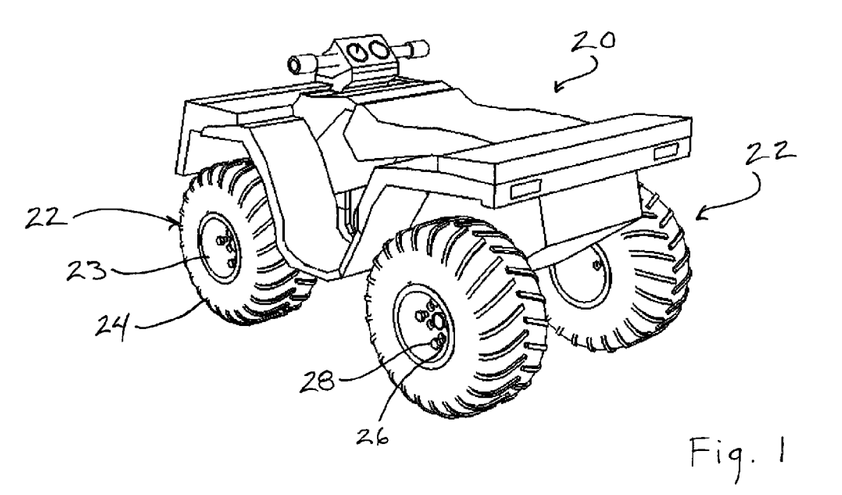
FIG. 1 is a perspective view of an all-terrain vehicle.
Figure 2:
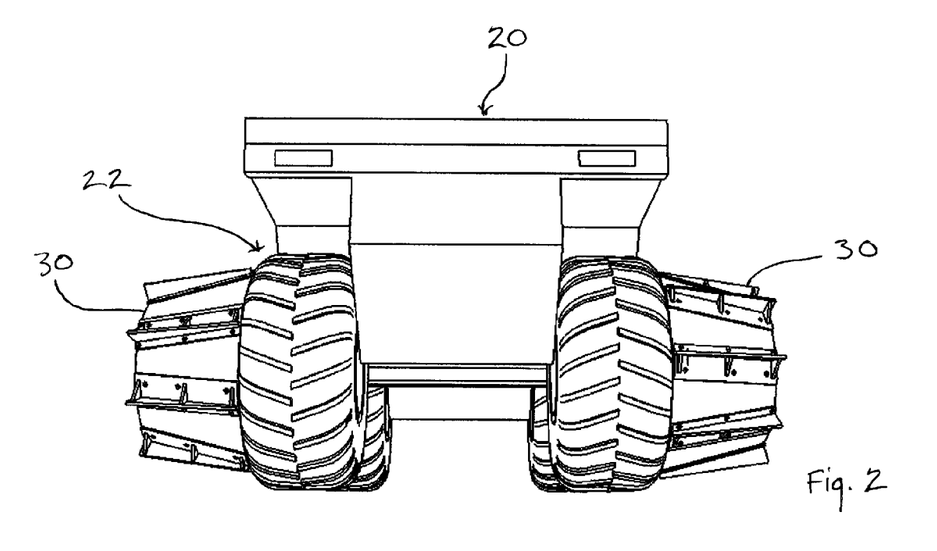
FIG. 2 is a rear elevation view of an all-terrain vehicle equipped with traction-assist devices according to an embodiment of the present invention.

Referring to FIG. 1, an all-terrain vehicle (ATV) 20 is depicted, having four wheel assemblies 22. Each wheel assembly 22 comprises a wheel 23 having a tire 24 mounted thereon, a wheel hub 25 (not shown) having a plurality of wheel studs 26 protruding therefrom, and a plurality of lugnuts 28. Wheel 23 is installed over wheel studs 26, and coupled to hub 25 by tightening lugnuts 28 on studs 26. In another embodiment, ATV 20 may be provided with quick mount wheels having a single center stud and single larger lugnut.

Referring now to FIGS. 2-9, various embodiments of a traction-assist device 30 are depicted. Traction-assist device 30 comprises a distal portion 32, a proximate portion 34, an exterior face or surface 36, a mounting portion 40, and one or more traction features. Traction-assist device 30 generally comprises a frusto-conical configuration wherein the diameter of distal portion 32 is less than the diameter of proximate portion 34. Traction-assist device 30 further includes a central axis 35 extending between proximate portion 34 and distal portion 32. The profile of the traction-assist device 30 between distal portion 32 and proximate portion 34 may be smooth and/or linear. In another embodiment, the profile of traction-assist device 30 may comprise an irregular or stepped profile, resembling a plurality of decreasing diameter discs extending outwardly from wheel assembly 22. Exterior face 36 may include a plurality of protrusions 38 thereupon to provide additional traction for traction-assist device 30. Exterior face 36 may be continuous, or comprise one or more apertures therein. In one embodiment, the inner structure of traction-assist device 30 may include mounting portion 40, having a plurality of holes 42 configured for receiving wheel studs. One or more reinforcements 44 may be included in traction-assist device 30, to provide added strength and rigidity without adding unnecessary weight.

Figure 6:
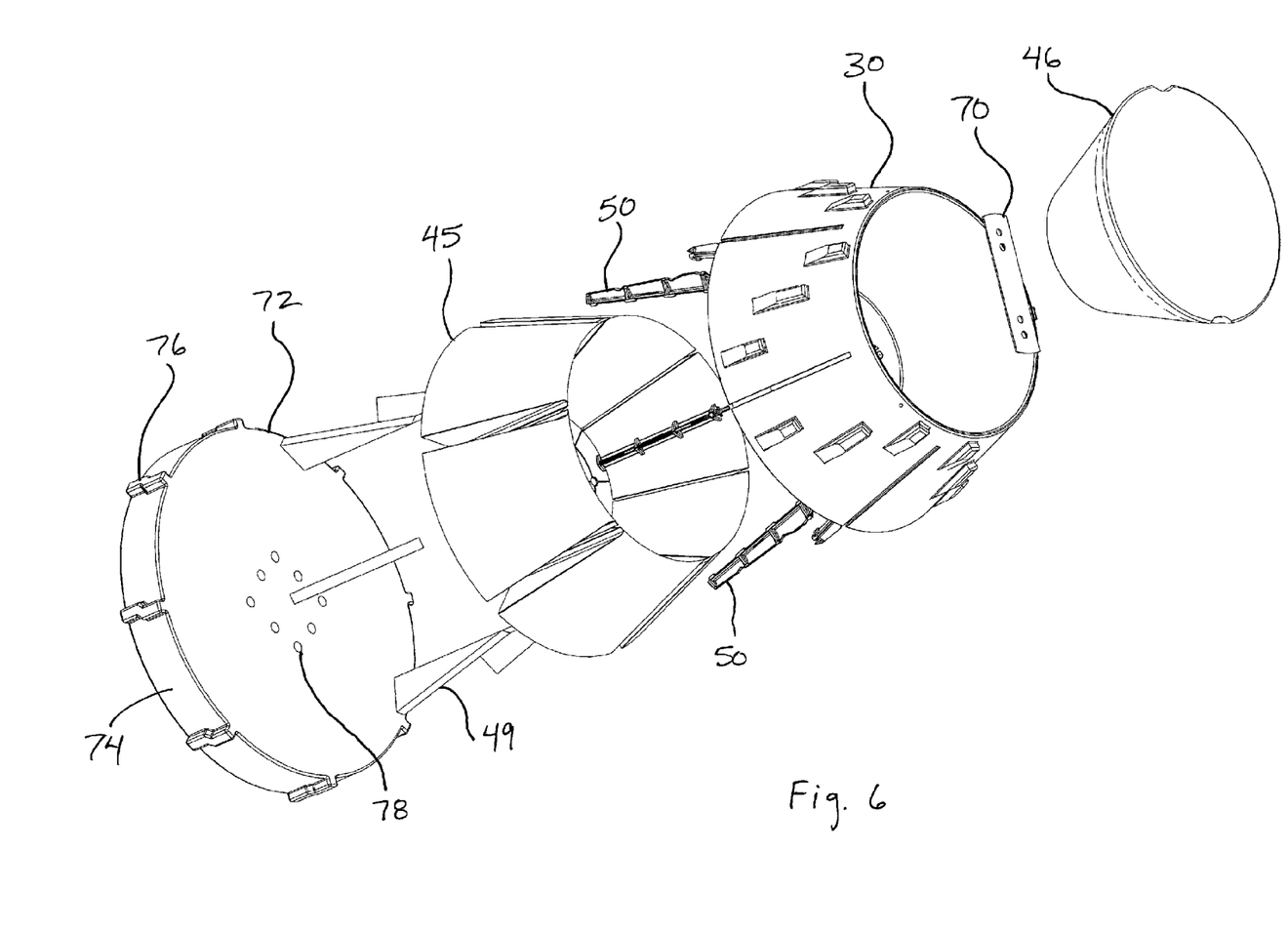
FIG. 6 is an exploded view of FIG. 5.
Figure 7:
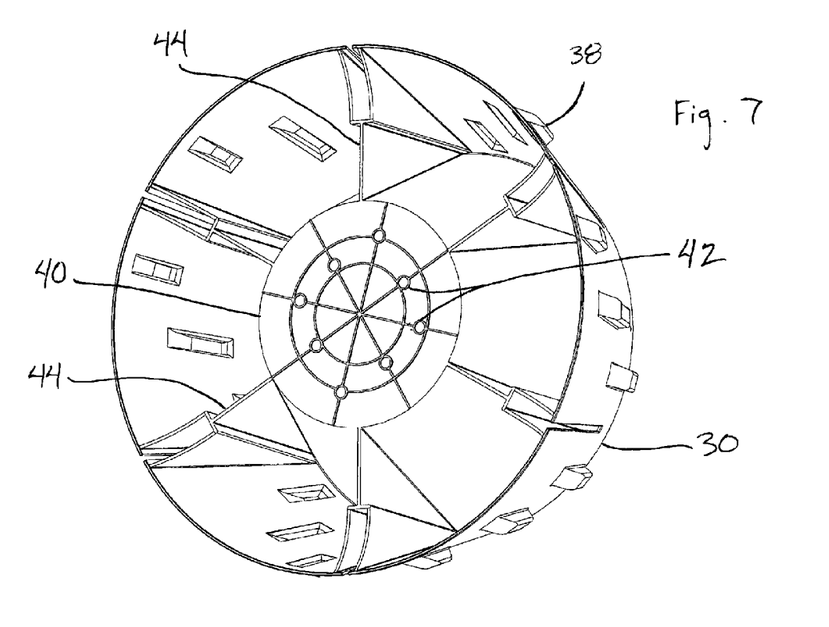
FIG. 7 is a rear perspective view of a traction-assist device according to the embodiment of FIG. 5.
Figure 8:
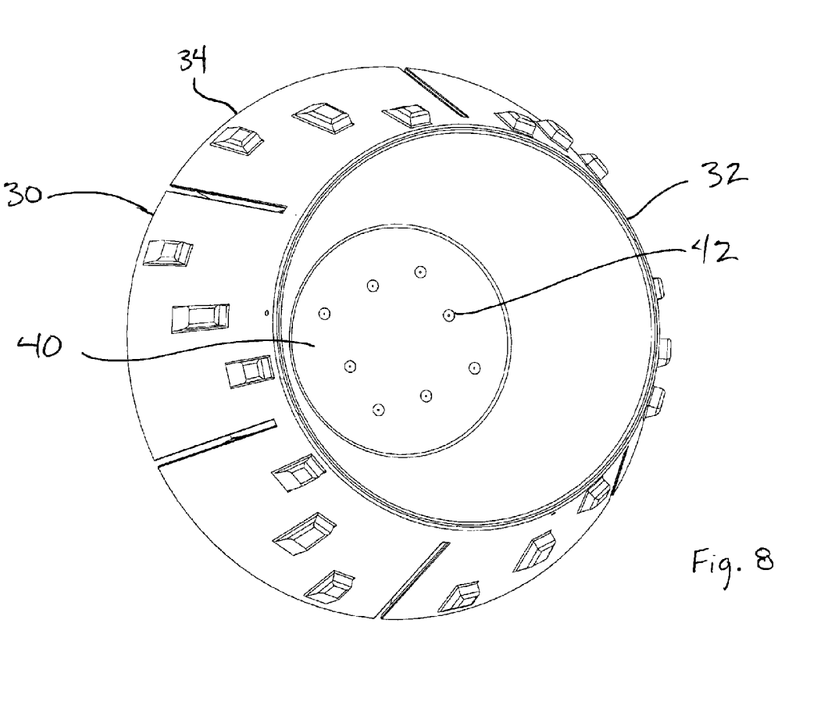
FIG. 8 is a front perspective view of a traction-assist device according to the embodiment of FIG. 5.
Figure 9:
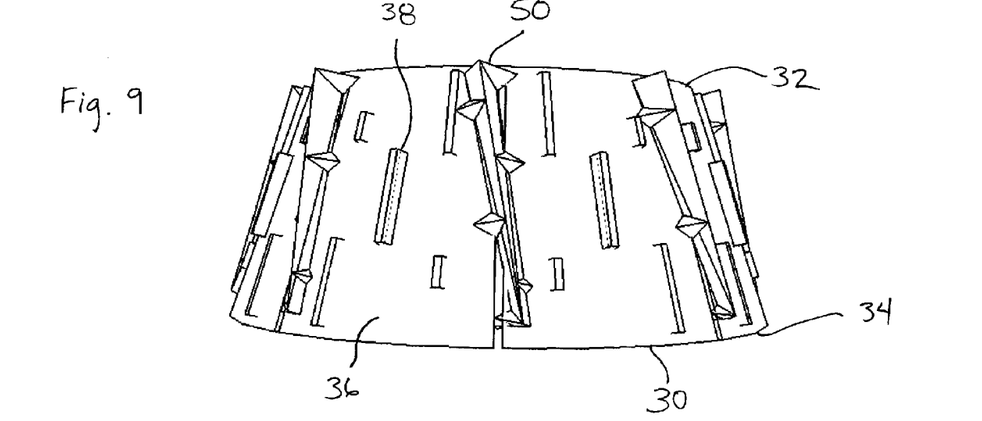
FIG. 9 is a top elevation view of a traction-assist device according to a further embodiment of the present invention.

In some embodiments, one or more inserts may be provided with traction-assist device 30 to increase the buoyancy and/or strength of device 30. Referring to FIG. 6, a first insert 45 and a second insert 46 are depicted. Inserts may be comprised of foam, preferably a closed-cell foam to prevent moisture absorption and water retention. However, open-cell foams may also be used, such as with a sealant to prevent moisture absorption in the foam. Additional inserts, such as foam wedge 49, may be provided to fill any voids in traction-assist device 30.

Figure 4:
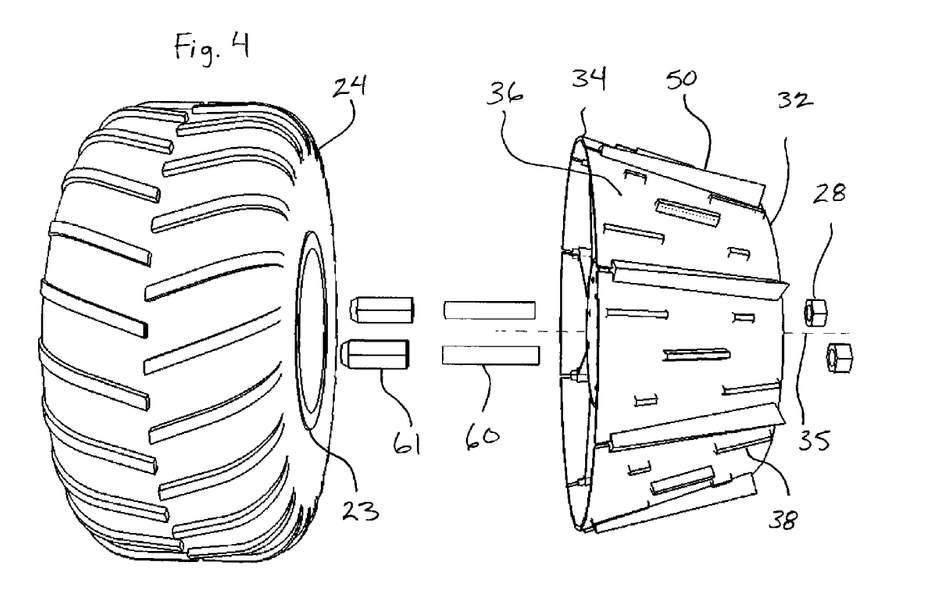
FIG. 4 is an exploded elevation view of the embodiment of FIG. 3.
Figure 10:
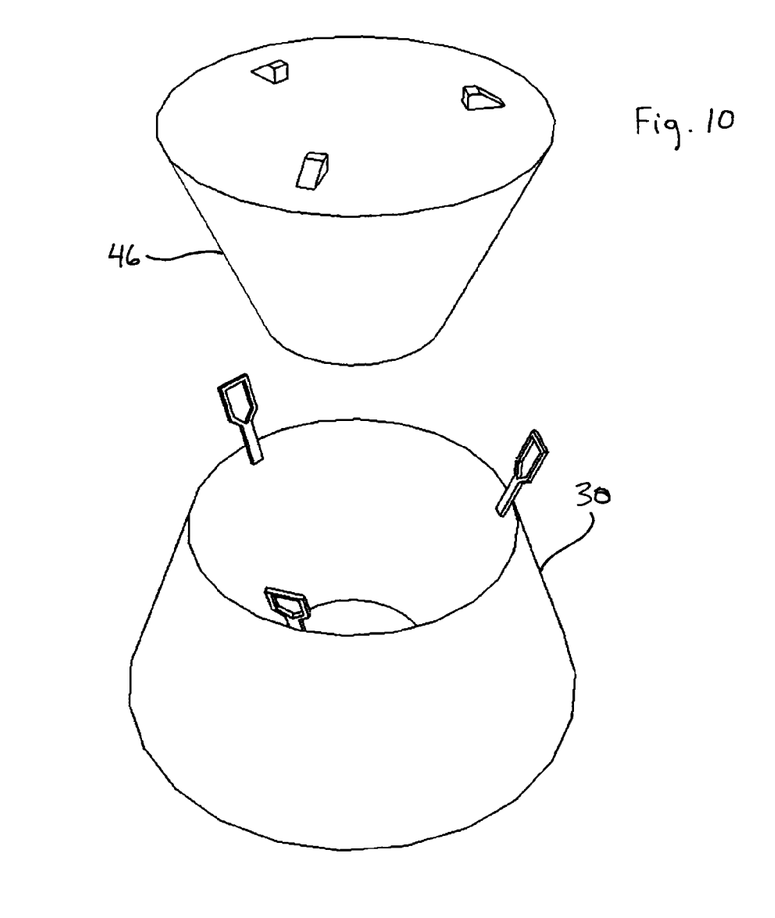
FIG. 10 is a perspective view of a traction-assist device and flotation insert according to a still further embodiment of the present invention.

In one embodiment, first insert 45 is retained within traction-assist device 30 as a result of traction-assist device 30 being installed on a wheel 23. An adhesive and/or mechanical fasteners may also be used to secure first insert 45. Second insert 46 is preferably removably coupled to traction-assist device 30, to allow access to mounting portion 40 of traction-assist device 30. Mechanical fasteners, such as screws through distal portion 32 into second insert 46, may be utilized for retaining second insert 46. In another embodiment, extended wheel studs are provided that protrude through second insert 46, such that traction-assist device 30 is retained at the distal portion 32, such as depicted in FIG. 4. In a further embodiment depicted in FIG. 10, traction-assist device 30 may include a plurality of buckles configured to selectively couple with corresponding protrusions on second insert 46.

In some embodiments, traction-assist device 30 may include a plurality of paddles 50, which may be coupled to face 36 of traction-assist device 30 by way of fasteners such as screws. In another embodiment depicted in FIGS. 6-8, traction-assist device 30 may include slots 37 to receive paddles 50. Paddles 50 may be removably coupled to traction-assist device 30, such as depicted in FIG. 6, to facilitate replacement in case of damage or wear to the paddles 50. The shape, size, material, arrangement and configuration of paddles 50 may be altered to tailor paddle 50 to a particular type of loose terrain. As an example, paddles 50 may be arranged parallel to the axis of rotation of device 30, or helically wound around device 30, or angled in a swept manner with respect to the direction of travel of the vehicle such as in FIG. 9, or angled with respect to exterior face 36. Paddles 50 may have a uniform or varied height with respect to an exterior surface of traction-assist device 30. Paddles 50 may be retained at least partly due to proximal portion 34 abutting tire 24.

Figure 3:
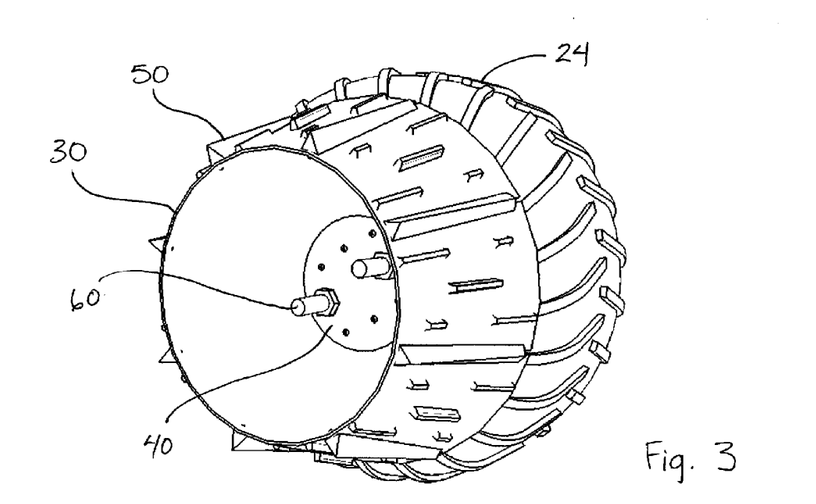
FIG. 3 is a perspective view of a wheel assembly having a traction-assist device installed according to a further embodiment of the present invention.

Traction-assist device 30 is configured to be removably coupled to wheel assembly 22, to facilitate rapid installation and removal. A variety of attachment means are within the scope and spirit of the present invention. In one embodiment, such as depicted in FIG. 3, the attachment means are accessible when traction-assist device 30 is coupled to wheel 23 of a vehicle. In one embodiment, at least two extended wheel studs 60 coupled to hub 25 are utilized. Extended wheel studs 60 may replace conventional wheel studs 26, or extended wheel studs 60 may be coupled to existing wheel studs 26 such as by an adapter collar 61, such as depicted in FIG. 4. Traction-assist device 30 is installed onto extended studs 60, such that proximate portion 34 of device 30 fits snugly against tire 24, and may be secured in place with lug nuts.

Figure 11:
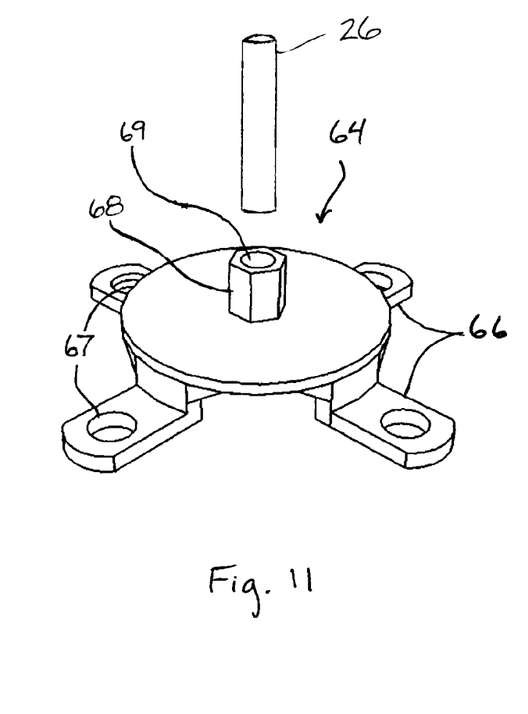
FIG. 11 is a perspective view of a coupler hub according to another embodiment of the present invention.

Referring now to FIG. 11, a coupler hub 64 may be provided for connecting traction-assist device 30 to wheel assembly 22. Coupler hub 64 includes a wheel mounting portion 66 and a device mounting portion 68. Wheel mounting portion 66 includes a plurality of bores 67 arranged in the same pattern as the wheel studs 26 of ATV 20. Wheel mounting portion is installed onto wheel studs 26 of ATV 20, and may be secured in place with lug nuts 28. Device mounting portion 68 may include one or more wheel studs, integrated with or removable from, coupler hub 64. In one embodiment, a single wheel stud 26 is coupleable to bore 69 of device mounting portion 68, such as depicted in FIG. 11. In another embodiment, device mounting portion 68 may be configured to retain two or more wheel studs.

In any of the mounting embodiments discussed herein, lug nuts may be tightened down directly onto mounting portion 40 of traction-assist device 30. In another embodiment, a plate 70 may be provided to add strength to the mounting of traction-assist device 30, as depicted in FIG. 6.

The attachment mechanisms used with various embodiments may comprise a quick-lock type system, or may comprise a plurality of bolts on or near proximate portion 34 of traction-assist assist device 30, or a plurality of arced keyhole slots on a hub coupled to wheel assembly 22. The shank of each bolt comprises a first diameter, while the head of each bolt comprises a second diameter, larger than the shank diameter, and each keyhole slot includes an insertion bore having a diameter slightly larger than that of the bolt head diameter, while the arced slot portion is sized to accommodate the bolt shank. The bolts are inserted into corresponding keyhole slots, and the device is rotated. The coupling hub may include a detent portion adapted to receive a bolt head, such that traction-assist device 30 remains locked into place during operation. In another embodiment, the keyhole slot is profiled such that as traction-assist device 30 is rotated into the coupler hub, proximate portion 34 of device 30 is drawn into contact with the sidewall of tire 24. Similar attachment means are described in U.S. Pat. Nos. 7,040,713 and 3,365,236, the disclosures of which are hereby incorporated by reference in their entireties.

Figure 12:
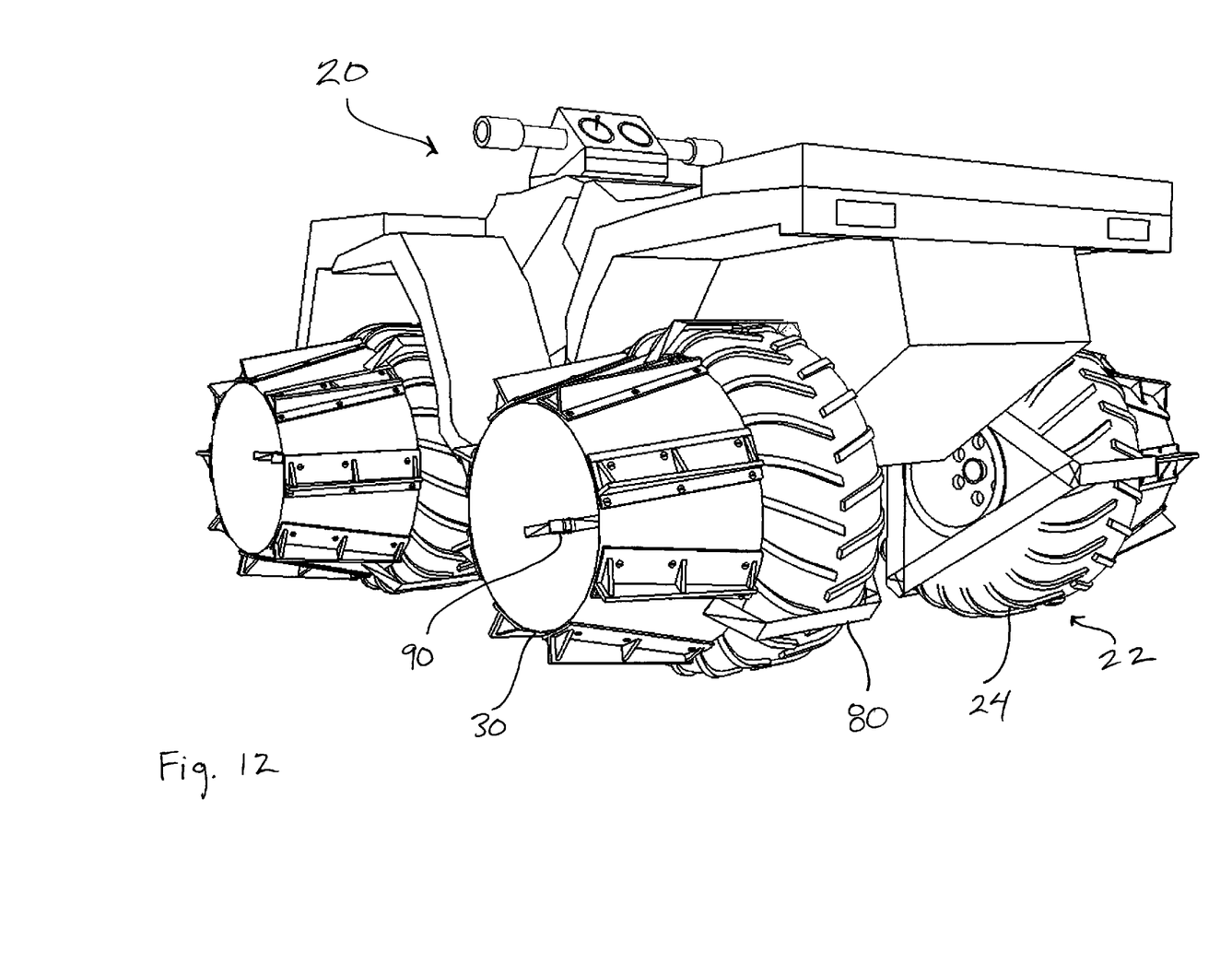
FIG. 12 is a perspective view of an all-terrain vehicle equipped with traction-assist devices according to a still further embodiment of the present invention.
Figure 13:
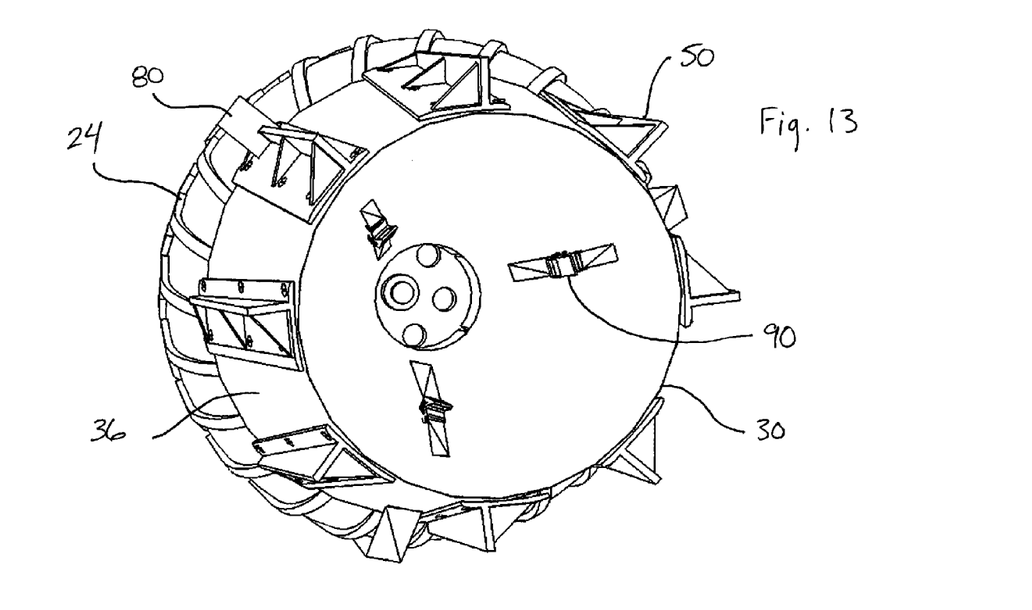
FIG. 13 is a front perspective view of a traction-assist device and a wheel assembly according to the embodiment of FIG. 12.
Figure 14:
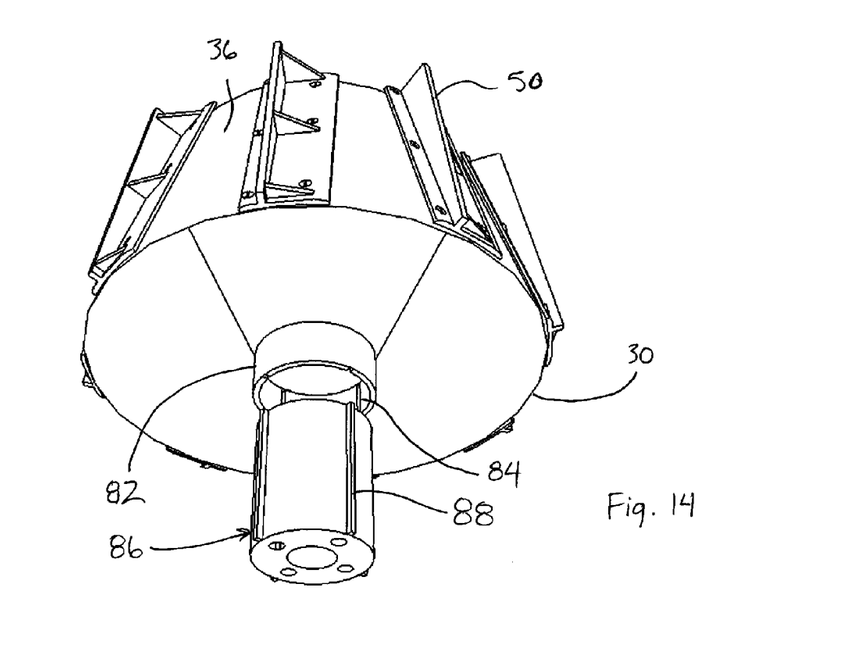
FIG. 14 is a rear perspective exploded view of a traction-assist device according to the embodiment of FIG. 12.
Figure 15:
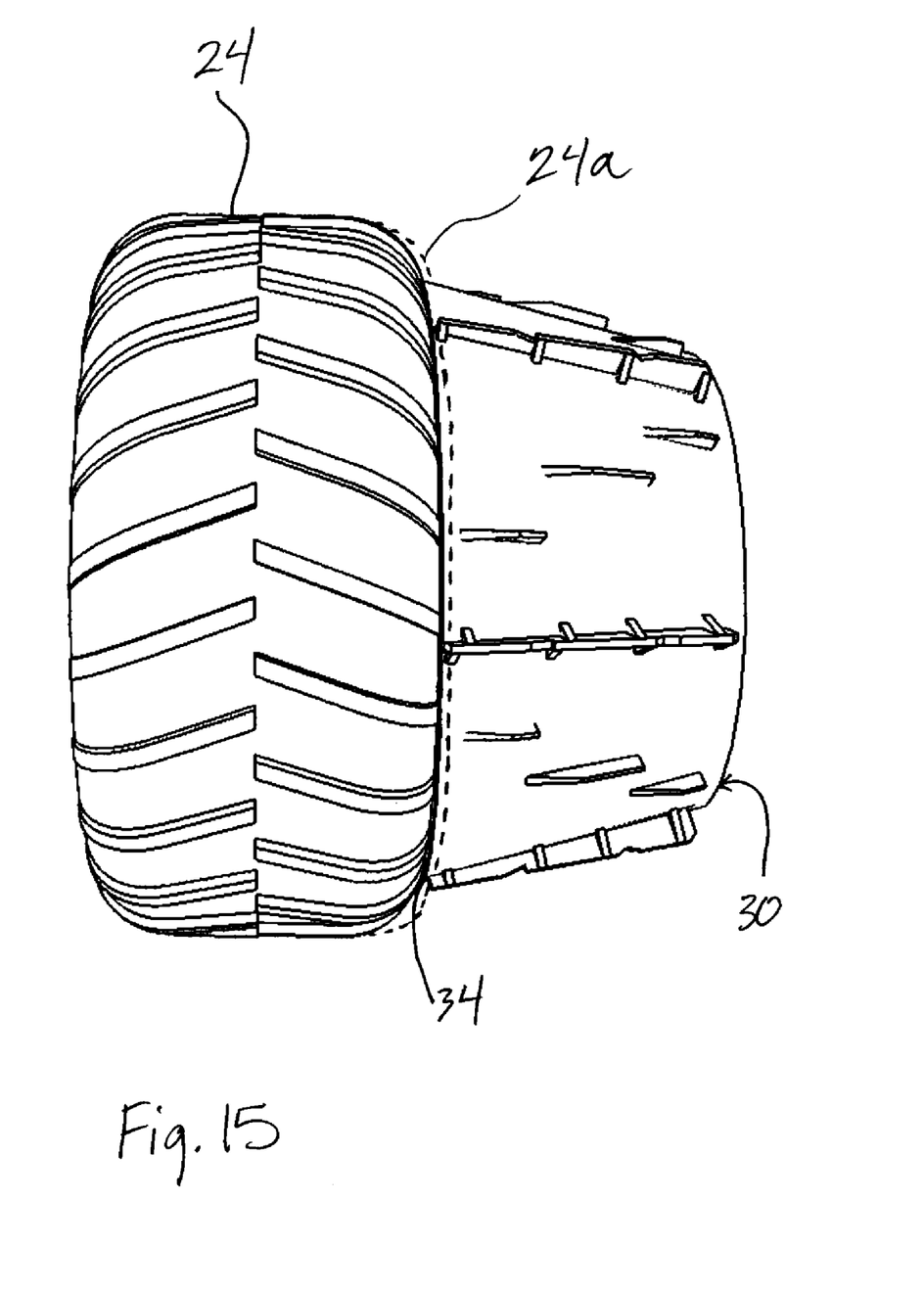
FIG. 15 is a rear perspective view of a traction-assist device installed on a wheel assembly so as to partially compress the sidewall of the tire.

Referring now to FIGS. 12-14, a further embodiment of attachment mechanisms for traction-assist device 30 is depicted. A plurality of straps 80 are provided for coupling device 30 to wheel assembly 22. In the present embodiment, traction-assist device 30 includes a receiver 82 having one or more slots 84, configured to couple with a hub 86 secured to wheel assembly 22. Hub 86 may be provided with one or more protrusions 88, such that slots 84 on receiver 82 are mated with protrusions 88, preventing rotation of traction-assist device 30 on wheel assembly 22. The inner cone portion of traction-assist device 30 includes one or more slots for passage of straps 80 from the exterior of device 30 to the interior. As depicted in the FIG. 12, straps 80 may be arranged in a triangular configuration, although other arrangements are within the scope of the invention. A retention means 90 is coupled to the inner portion of device 30, and is provided for tensioning and/or securing straps 80. Retention means 90 may comprise a cam-lock arrangement, ratchet arrangement, or similar means as would be apparent to one skilled in the art.

A wheeled ATV or utility vehicle may include identical traction-assist devices 30 on each wheel assembly. In one embodiment, the traction-assist devices installed on the rear of the vehicle are larger than those installed on the front, such that the devices on rear extend farther outwardly from the wheels as compared to the traction-assist devices installed on the front axle so that the rear track width is greater than the front track width. When traveling forward in loose terrain, such an arrangement allows the distal portions of the rear traction-assist devices to engage terrain outside of the path left by the devices on the front axle. In another embodiment, the traction features comprising paddles 50 and/or protrusions 38 may be arranged differently on the front wheels of the vehicle than those on the rear wheels of the vehicle, and/or the number of traction features on the front wheels may be different than those on the rear wheels. In another embodiment, traction-assist devices 30 may be installed only on certain wheels, such as the rear wheels.

Figure 5:
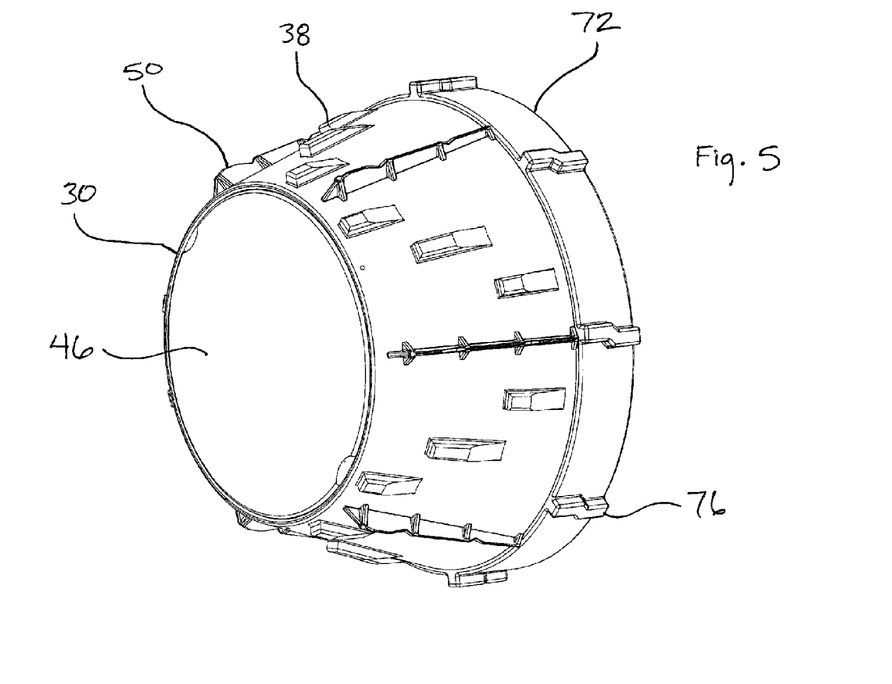
FIG. 5 is a perspective view of a traction-assist device according to another embodiment of the present invention.

One or more spacers 72 may be provided in conjunction with traction-assist devices 30, such as depicted in FIGS. 5-6. A spacer 72 is placed between traction-assist device 30 and a wheel 23, and includes an exterior profile 74 having a plurality of protrusions 76, and one or more bores 78 configured to adapt with the mounting arrangement for traction-assist device 30. Spacer 72 provides additional traction for the vehicle due to the additional surface area, as well as providing buoyancy. Spacer 72 may also include foam to increase its buoyancy. Spacers 72 may be used to increase the rear track width of a vehicle, allowing the distal portions of the rear traction-assist devices to engage terrain outside of the path left by the devices on the front axle.

When installed on a vehicle, the center axis 35 of traction-assist device 30 is aligned with the center axis of wheel 23 and wheel hub 25. In the event a spacer 72 is utilized, the center axis of spacer 72 is aligned with the center axes of traction-assist device 30 and wheel hub 25. In one embodiment, proximate portion 34 of traction-assist device 30 is configured to come into contact with the sidewall of tire 24 when installed. In another embodiment, proximate portion 34 is configured to partially compress the sidewall of tire 24 when installed. Traction-assist device 30 is sized in view of the size of the wheel and tire to which it will be coupled. In all embodiments, the diameter of proximal portion 34 of device 30 is greater than the diameter of the wheel 23 and less than the overall diameter of the tire 24. In one embodiment, the diameter of proximal portion 34 is greater than 75% of the overall diameter of tire 24. Traction-assist device 30 may be configured such that distal portion 32 extends outwardly a distance greater than a width of tire 24. Traction-assist device 30 may be configured so as to have a weight that is less than half the weight of wheel 23.

The present invention improves traction of a vehicle upon which it is installed when navigating loose terrain, and improves flotation of a vehicle navigating water. Traction is improved by at least part of the traction-assist device engaging with the loose terrain. Loose terrain may comprise dirt, mud, sand, silt, snow, water, or any combination thereof, being characterized as un-firm, such that a vehicle is capable of sinking into the terrain when traveling on it. As used herein, loose terrain is defined as terrain that a vehicle equipped with a traction-assist device 30 will sink into to a distance where at least a portion of the traction-assist device will engage the terrain. In one embodiment, the traction-assist device engages the loose terrain in a substantially continuous manner during normal operation of the vehicle.

In contrast, during operation of a vehicle equipped with the present invention on normal terrain, the traction-assist device will not ordinarily contact the terrain. Normal terrain as used herein is defined as firm or compact terrain such that the vehicle does not sink into the terrain a sufficient amount to cause engagement of the traction-assist device with the terrain. Normal terrain may comprise grass, gravel, hard dirt, or paved surfaces. In some circumstances, the traction-assist device of a vehicle being operated on normal terrain may momentarily come into contact with the terrain, such as during hard cornering or travel over uneven or undulating surfaces, but the traction-assist device is not substantially continuously engaging the normal terrain during normal operation of the vehicle.

The traction-assist devices 30 of the present invention provide a number of benefits. During operation on normal terrain as discussed herein, traction-assist device 30 is designed not to contact the ground, thereby not increasing drag. Further, the frusto-conical configuration of traction-assist device 30 allows the vehicle to be leaned during cornering up to a predetermined amount, thereby not negatively affecting the handling of the vehicle. In the event the vehicle is leaned aggressively, the traction-assist device 30 may contact the ground, thereby preventing the vehicle from rolling. During operation in loose terrain, at least a portion of traction-assist device 30 is adapted to be contact with the loose terrain, and the frusto-conical configuration of the various embodiments of traction-assist device 30 tends to direct any flying debris outwardly and away from the operator of the vehicle when operated in loose terrain.

Traction-assist device 30 may be constructed of a variety of materials to suit the desired application. Steel, aluminum or other alloys are desirable for heavier-duty applications, while various polymers, composites, reinforced plastics, or other suitable lightweight, durable, materials may be utilized for lighter-duty applications. Spacer 72 may be constructed of materials similar to those used for device traction-assist 30, and may be filled with foam.

Although described mostly in reference to all-terrain vehicles and utility vehicles, the traction-assist device of the present invention is also adaptable for use with other vehicles in the agricultural, construction, industrial, recreational and transportation industries, such as skid steers, tractors, and other off-highway and off-road wheeled vehicles. Additionally, the present invention is adaptable to three-wheeled vehicles, having a single traction-assist device on either side of the front wheel, secured by a central mounting apparatus.

Various embodiments of systems, devices and methods have been described herein. These embodiments are given only by way of example and are not intended to limit the scope of the present invention. It should be appreciated, moreover, that the various features of the embodiments that have been described may be combined in various ways to produce numerous additional embodiments. Moreover, while various materials, dimensions, shapes, implantation locations, etc. have been described for use with disclosed embodiments, others besides those disclosed may be utilized without exceeding the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for increasing traction of a wheeled vehicle in loose terrain, comprising:
    a traction-assist device having a proximal portion configured to abut a tire of a vehicle and one or more traction features presented on an outer surface of the traction-assist device between the proximal portion and a distal portion, the traction features presented on the outer surface having an effective diameter relative to an axis of the tire that is less than an overall diameter of the tire, the traction features retained at least partly by the proximal portion abutting the tire of the vehicle; and
    structure within an inner portion of the traction assist device adapted to enable releasable coupling of the traction-assist device to a wheel hub of the vehicle,
    wherein at least the one or more traction features are configured to engage with terrain during operation of the vehicle in loose terrain and to not engage with terrain during operation of the vehicle on normal terrain.

2. The system of claim 1, wherein the proximal portion of the traction-assist device is configured to partially laterally compress an adjacent portion of a sidewall of the tire of the vehicle when the device is coupled to the wheel assembly.

3. The system of claim 1, wherein the one or more traction features are selectively removable.

4. The system of claim 1, further comprising a flotation insert configured to be removably coupled to and removable from the traction-assist device without removing the device from the vehicle.

5. The system of claim 1, wherein the diameter of the proximal portion of the frusto-conical structure is greater than a diameter of a wheel hub of the wheel assembly and is at least 75% of the overall diameter of the tire.

6. The system of claim 1, wherein the system has a weight that is less than half the weight of the wheel assembly.

7. A loose terrain traction assist device for wheeled vehicles, comprising:
    a generally frusto-conical structure having:
        a proximal portion with a diameter smaller than an overall diameter of a tire of a vehicle;
        a distal portion configured to extend outwardly from the tire;
        an outer surface defined between the proximal portion and the distal portion; and
        an outboard cavity extending generally between the distal portion and a mounting portion; and
        an inboard cavity situated underneath the outer surface;
    a plurality of traction features coupled to the outer surface of the generally frusto-conical structure, the plurality of traction features configured to be retained at least in part by the frust-conical structure being positioned against the tire;
    an outboard flotation insert adapted to be removably coupled in the outboard cavity;
    an inboard flotation insert positioned within the inboard cavity;
    an annular spacer operably positionable between the frusto-conical structure and the wheel assembly, the annular spacer having a substantially constant outer diameter that is less than an overall diameter of the tire; and attachment means for releasably coupling the frusto-conical structure to a wheel assembly of the vehicle such that the mounting portion is proximate the wheel assembly, such that at least part of the frusto-conical structure or part of the annular spacer is adapted to engage with terrain during operation of the vehicle in loose terrain and to not engage with terrain during operation of the vehicle on normal terrain.

* * * * *